US008648909B2

(12) United States Patent
Imaizumi et al.

(10) Patent No.: US 8,648,909 B2
(45) Date of Patent: Feb. 11, 2014

(54) CAMERA MONITORING APPARATUS AND REGISTRATION METHOD THEREOF

(75) Inventors: Satoshi Imaizumi, Tokyo (JP); Keisuke Tamiya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1517 days.

(21) Appl. No.: 11/950,657

(22) Filed: Dec. 5, 2007

(65) Prior Publication Data

US 2008/0158356 A1 Jul. 3, 2008

(30) Foreign Application Priority Data

Dec. 28, 2006 (JP) ................................. 2006-355889

(51) Int. Cl.
*H04N 7/18* (2006.01)
(52) U.S. Cl.
USPC ...... 348/143; 348/144; 348/211.1; 348/211.3
(58) Field of Classification Search
USPC ......... 348/143, 148, 159, 211.3, 211.11, 144, 348/211.1
See application file for complete search history.

(56) References Cited

U.S. PATENT DOCUMENTS

| | | | | |
|---|---|---|---|---|
| 5,808,670 A | * | 9/1998 | Oyashiki et al. | 348/143 |
| 6,002,995 A | * | 12/1999 | Suzuki et al. | 348/143 |
| 6,122,005 A | * | 9/2000 | Sasaki et al. | 348/211.3 |
| 6,208,379 B1 | * | 3/2001 | Oya et al. | 348/143 |
| 6,400,401 B1 | * | 6/2002 | Morino et al. | 348/211.1 |
| 6,414,716 B1 | * | 7/2002 | Kawai | 348/211.3 |
| 7,155,299 B2 | * | 12/2006 | Yong et al. | 700/114 |
| 7,248,794 B2 | * | 7/2007 | Levin et al. | 348/144 |
| 7,590,339 B2 | * | 9/2009 | Kurosawa | 348/351 |
| 2003/0020811 A1 | * | 1/2003 | Hunter et al. | 348/143 |
| 2005/0212909 A1 | * | 9/2005 | Takehara et al. | 348/36 |
| 2006/0256195 A1 | * | 11/2006 | Ogawa | 348/143 |

FOREIGN PATENT DOCUMENTS

| | | | |
|---|---|---|---|
| JP | 11-191858 | A | 7/1997 |
| JP | 10-336503 | A | 12/1998 |
| JP | 2003-256946 | A | 9/2003 |
| JP | 2005-130390 | A | 5/2005 |
| JP | 2005-234824 | A | 9/2005 |
| JP | 2005-303806 | A | 10/2005 |
| JP | 2006-129218 | A | 5/2006 |

\* cited by examiner

*Primary Examiner* — Ramy M Osman
(74) *Attorney, Agent, or Firm* — Canon USA, Inc., I.P. Division

(57) ABSTRACT

A monitoring apparatus includes a display control unit configured to cause a display device to display an image captured by a camera and a registration screen which corresponds to the image, which allows a user to register an object status within the image and a registration unit configured to register the object status within the image input through the registration screen.

12 Claims, 20 Drawing Sheets

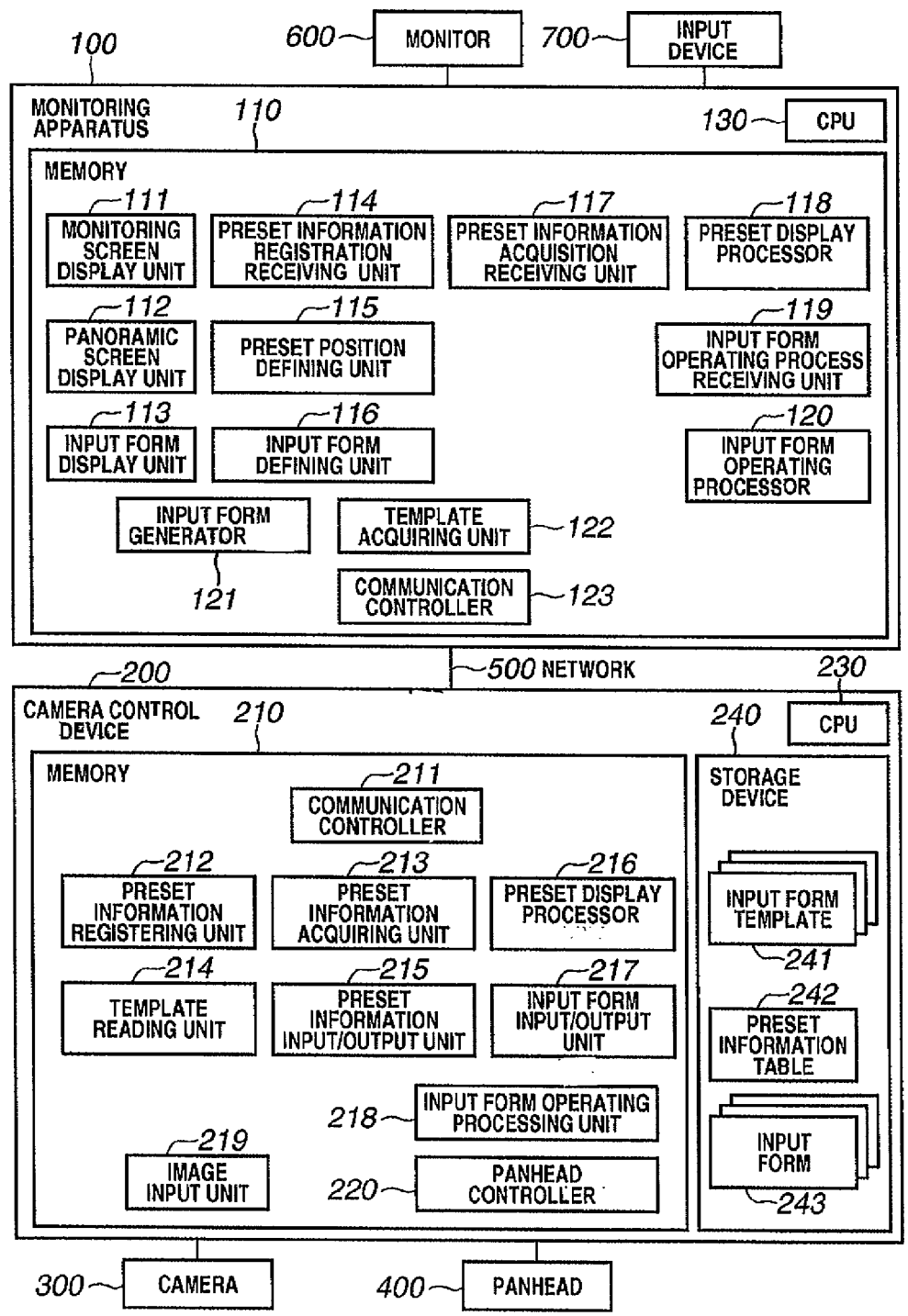

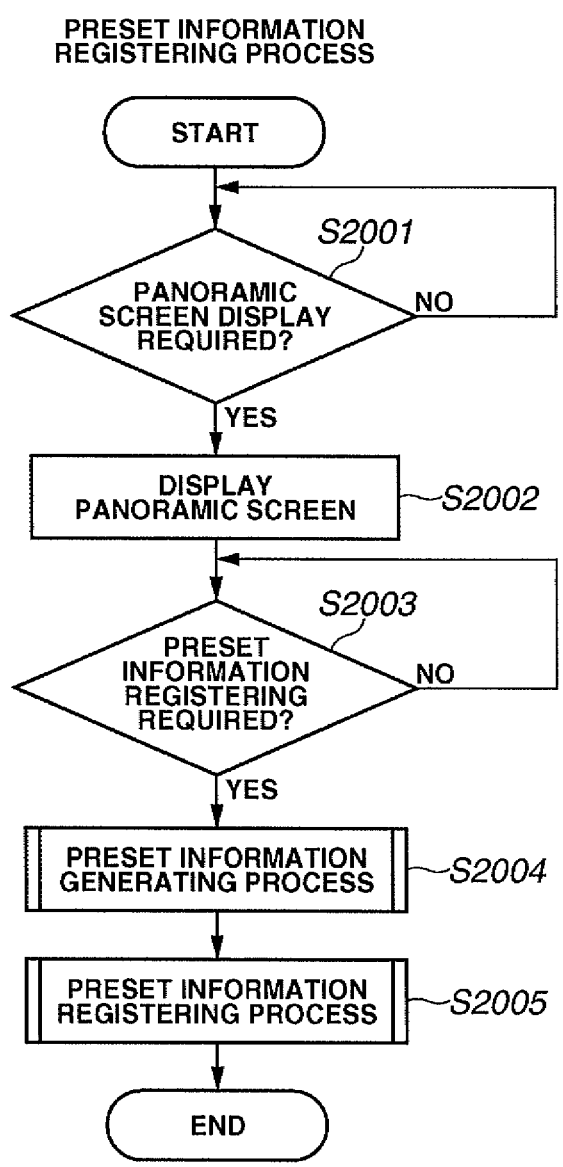

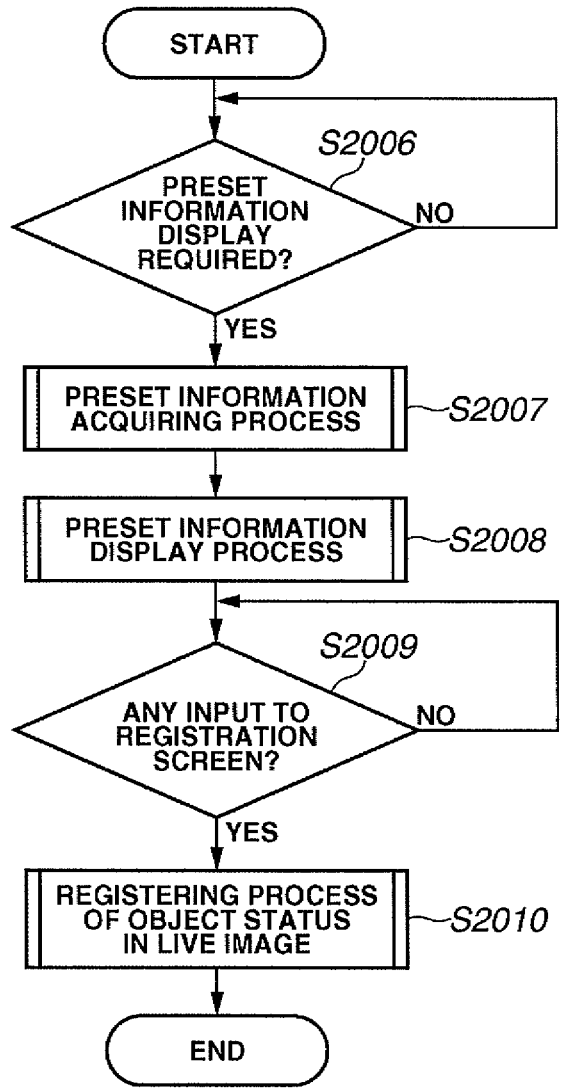

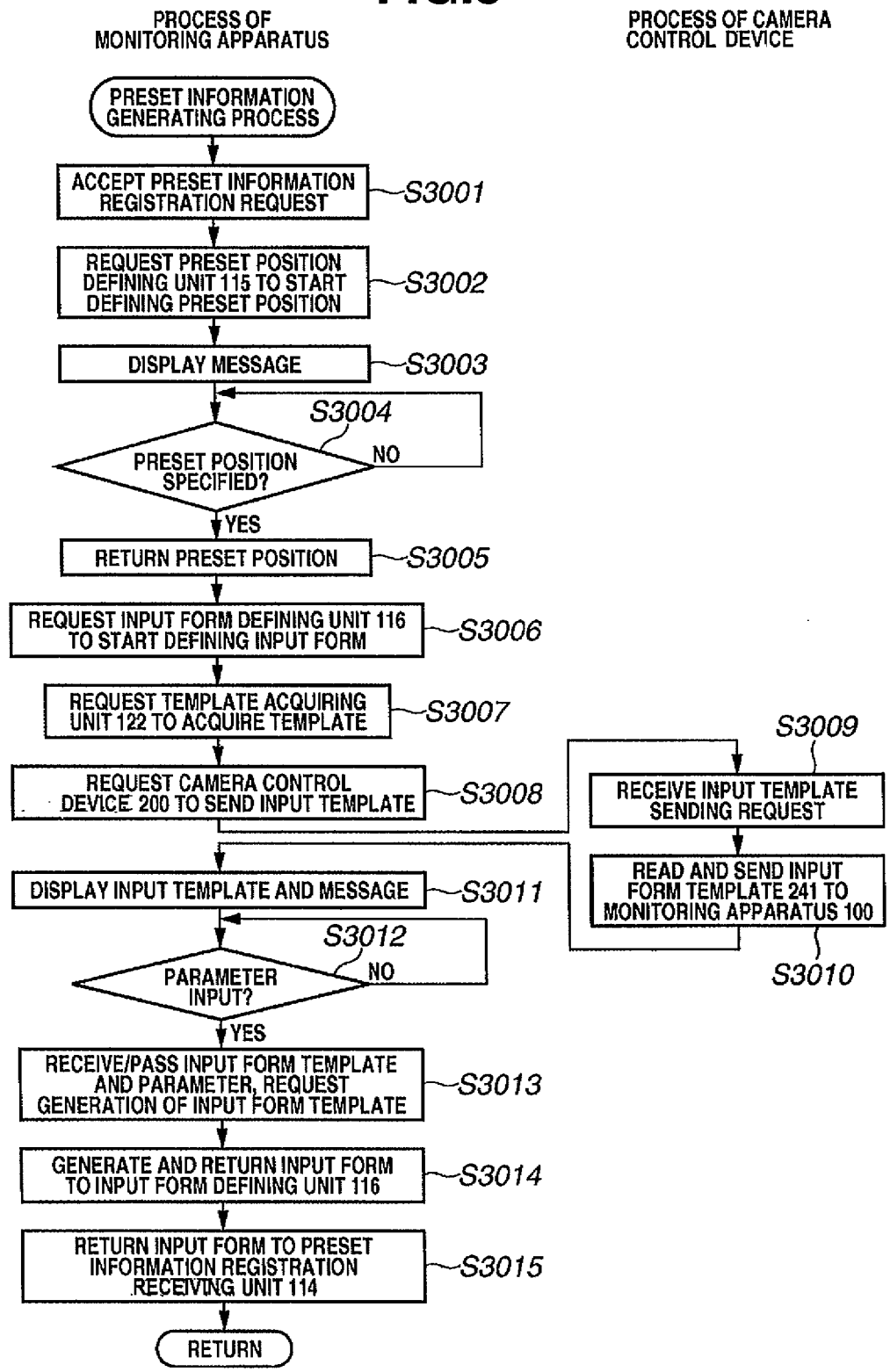

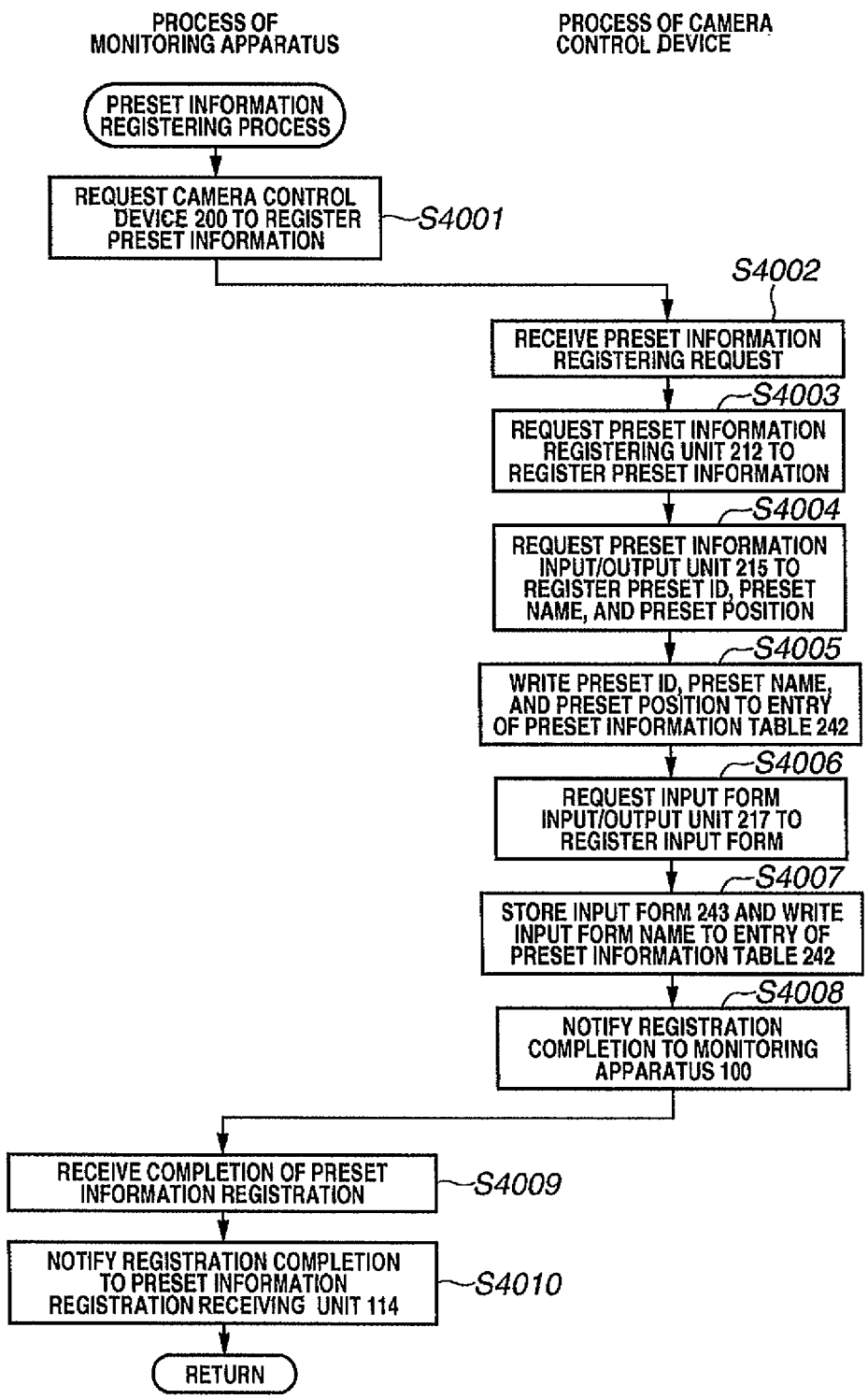

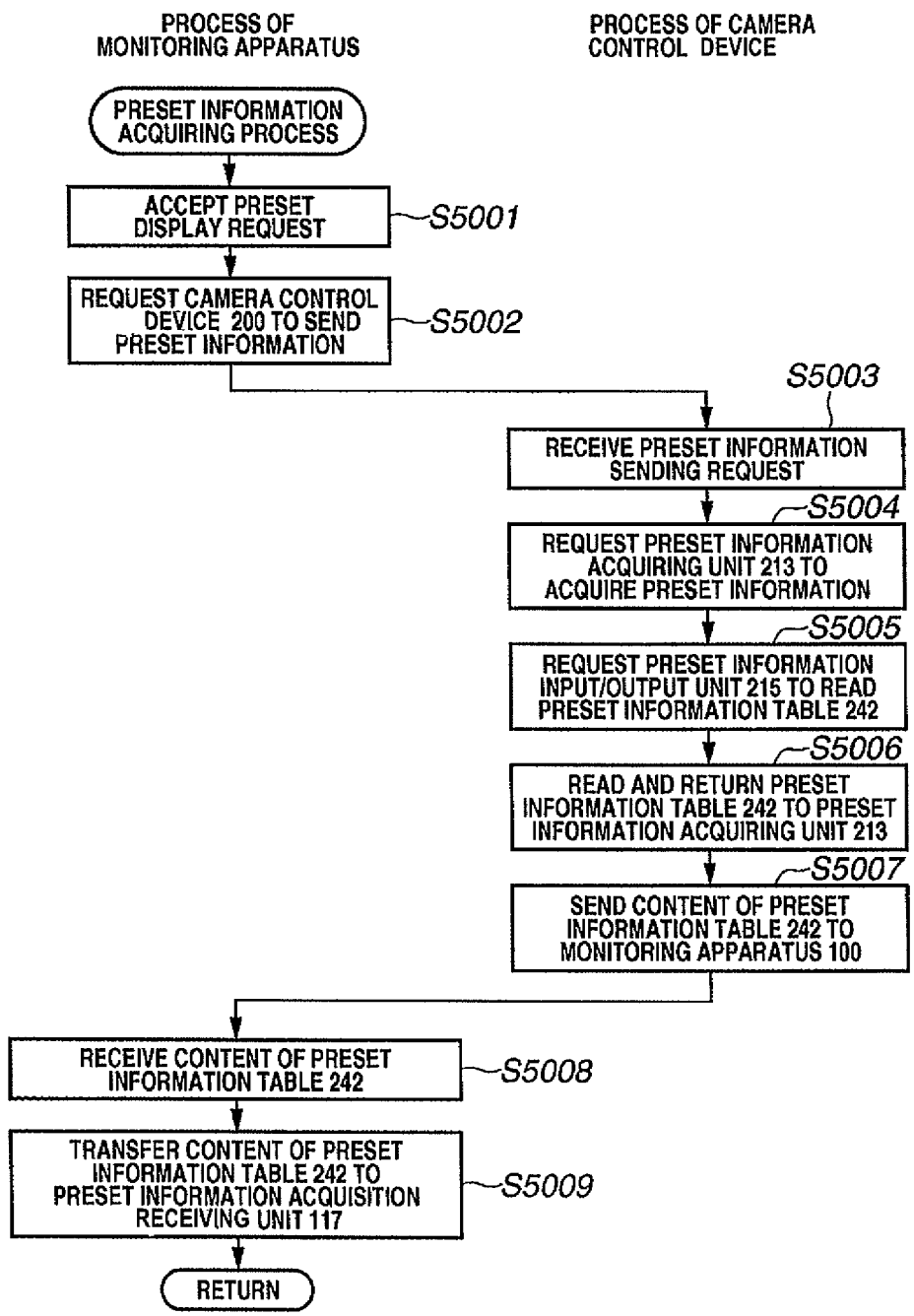

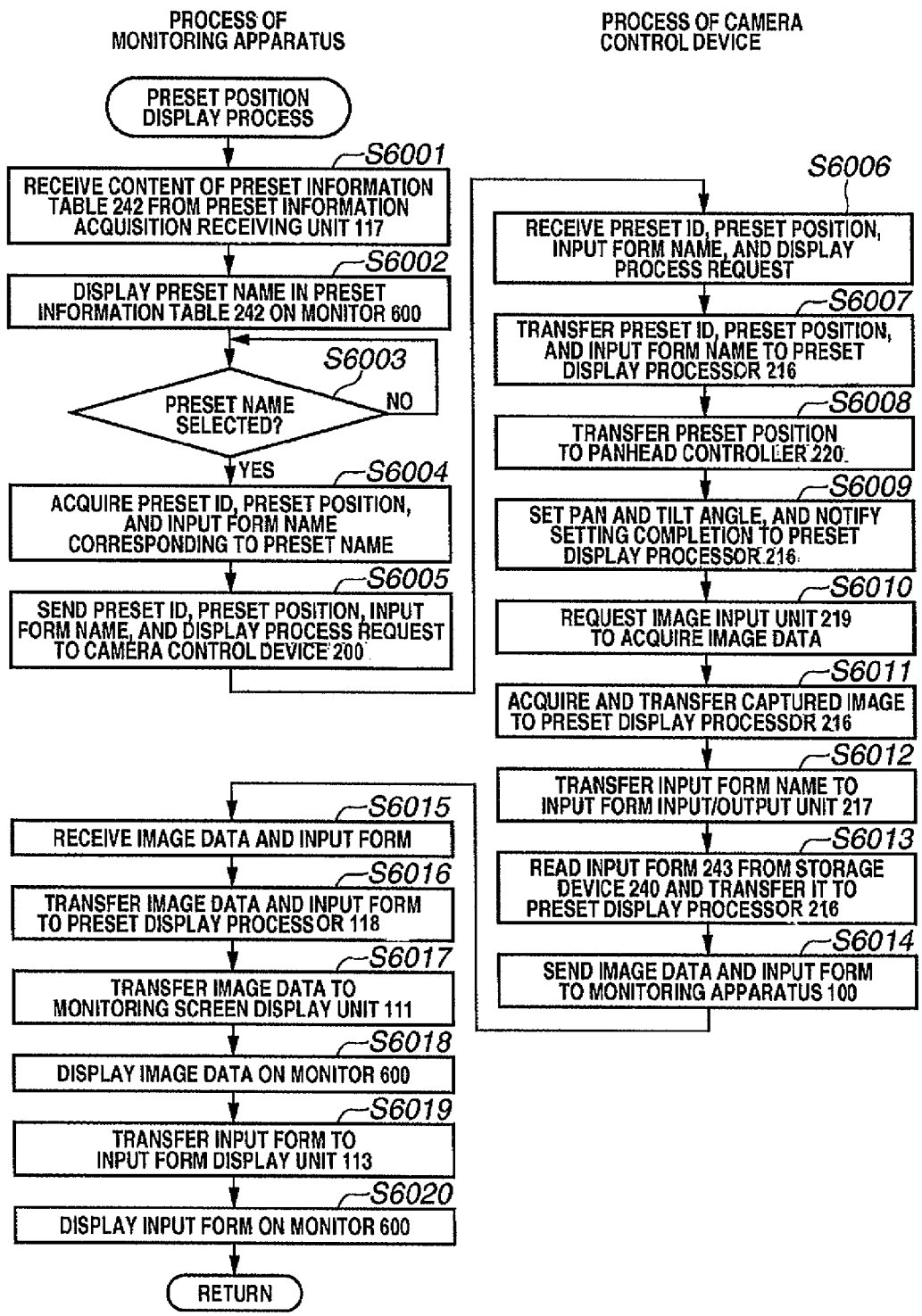

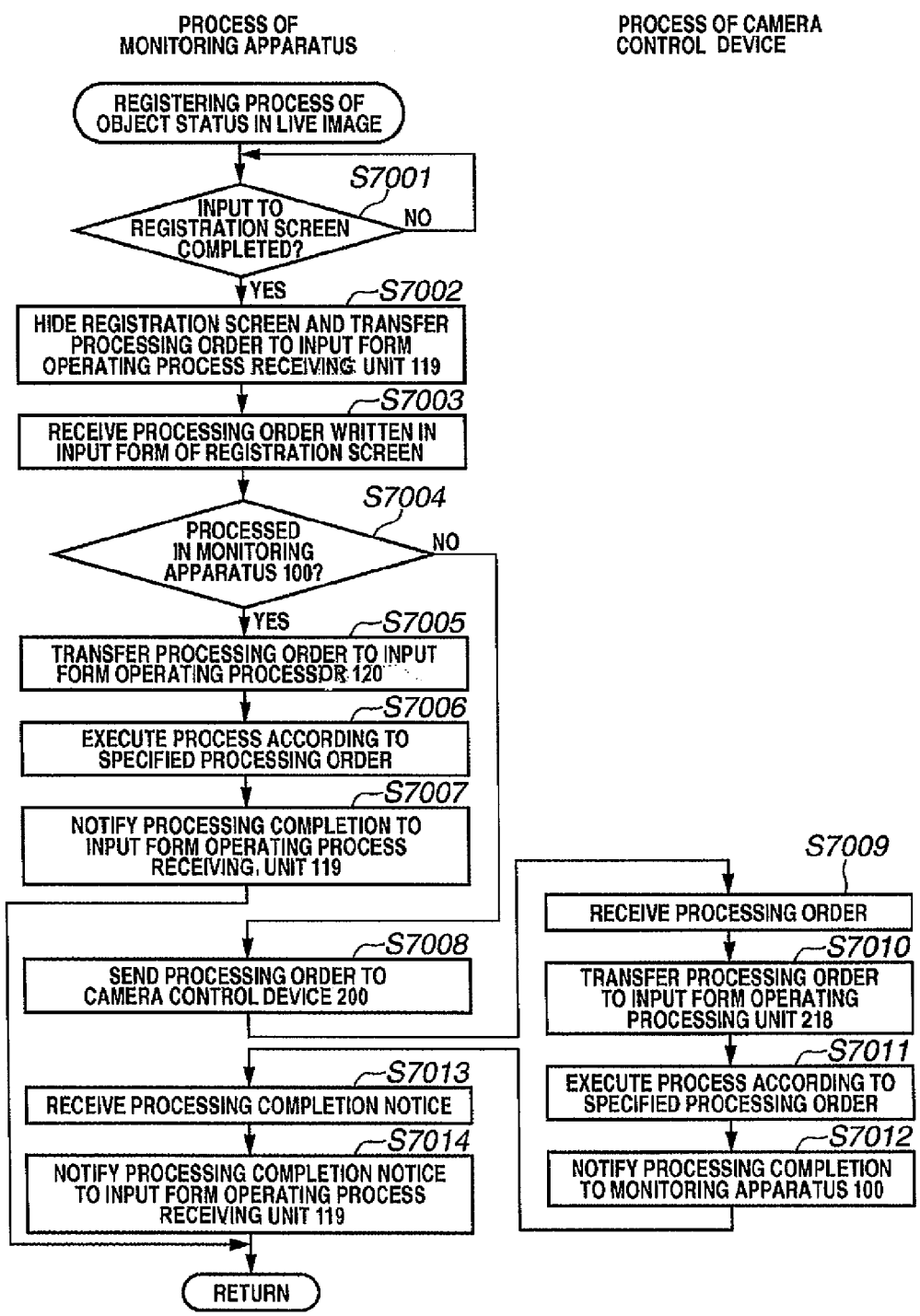

FIG.9A

EXAMPLE OF INPUT FORM TEMPLATE AND REGISTRATION SCREEN

| TITLE |
|---|
| MESSAGE |
| ( $A )   ( $B ) |

| WINDOW |
|---|
| IS A WINDOW LOCKED? |
| ( YES )   ( NO ) |

FIG.9B

TEMPLATE DESCRIPTION EXAMPLE (SVG)

```
<svg>
  <script>
   var action_id=$1;
   function action(){
    switch(action_id){
    case 0:
      break;
    case 1:
      saveLog();
      break;
    }
   }
  </script>
  <rect x="0" y="0" width="200" height="30" fill="#BBBBBB"/>
  <rect x="0" y="30" width="200" height="60" fill="#DDDDDD"/>

<text id="title" x="5" y="20" font-size="15">TITLE</title>
  <text id="msg" x="5" y="50" font-size="15">MESSAGE</title>

<g id="button01" onclick="action();">
   <rect x="10" y="60" rx="15" width="40" height="24"
    fill="#ADD8E6" stroke="#000000"/>
   <text x="30" y="75" font-size="12" text-anchor="middle">$A</tesxt>
  </g>

<g id="button01" onclick="action();">
   <rect x="145" y="60" rx="15" width="40" height="24"
    fill="#E08080" stroke="#000000"/>
   <text x="165" y="75" font-size="12" text-anchor="middle">$B</tesxt>
  </g>
</svg>
```

FIG.9C
INPUT FORM DESCRIPTION EXAMPLE GENERATED FROM TEMPLATE (SVG)

```
<svg>
  <script>
   var action_id=1;
   function action(){
    switch(action_id){
    case 0:
     break;
    case 1:
     saveLog();
     break;
    }
   }
  </script>
  <rect x="0" y="0" width="200" height="30" fill="#BBBBBB"/>
  <rect x="0" y="30" width="200" height="60" fill="#DDDDDD"/>

<text id="title" x="5" y="20" font-size="15"> WINDOW </title>
  <text id="msg" x="5" y="50" font-size="15"> IS A WINDOW LOCKED? </title>

<g id="button01" onclick="action();">
   <rect x="10" y="60" rx="15" width="40" height="24"
    fill="#ADD8E6" stroke="#000000"/>
   <text x="30" y="75" font-size="12" text-anchor="middle">YES </tesxt>
  </g>

<g id="button02" onclick="action();">
   <rect x="145" y="60" rx="15" width="40" height="24"
    fill="#E08080" stroke="#000000"/>
   <text x="165" y="75" font-size="12" text-anchor="middle"> NO </tesxt>
  </g>
</svg>
```

FIG.10

| PRESET ID | PRESET NAME | PRESET POSITION | REGISTRATION SCREEN NAME |
|---|---|---|---|
| 0001 | ENTRANCE | PAN ANGLE = 0 DEGREE, TILT ANGLE = 0 DEGREE | form0001.frm |
| 0002 | WINDOW | PAN ANGLE = 60 DEGREE, TILT ANGLE = 0 DEGREE | form0002.frm |
| 0003 | LAMP | PAN ANGLE = 0 DEGREE, TILT ANGLE = 70 DEGREE | form0003.frm |
| 0004 | SHELF | PAN ANGLE = -60 DEGREE, TILT ANGLE = -10 DEGREE | form0004.frm |

FIG.11A form0001.frm

| DOOR |
| --- |
| IS A DOOR CLOSED? |
| YES    NO |

FIG.11B form0002.frm

| WINDOW |
| --- |
| IS A WINDOW LOCKED? |
| YES    NO |

FIG.11C form0003.frm

| LAMP |
| --- |
| IS A LAMP TURNED OFF? |
| YES    NO |

FIG.11D form0004.frm

| SHELF |
| --- |
| IS THERE ANY UNIDENTIFIED OBJECT? |
| YES    NO |

| PRESET ID | PRESET NAME | PRESET POSITION | REGISTRATION SCREEN NAME |
|---|---|---|---|
| 0001 | ENTRANCE | PAN ANGLE = 0 DEGREE, TILT ANGLE = 0 DEGREE, ZOOM VALUE = 10 | form0001.frm |
| 0002 | WINDOW | PAN ANGLE = 60 DEGREE, TILT ANGLE = 0 DEGREE, ZOOM VALUE = 5 | form0002.frm |
| 0003 | LAMP | PAN ANGLE = 0 DEGREE, TILT ANGLE = 70 DEGREE, ZOOM VALUE = 13 | form0003.frm |
| 0004 | SHELF | PAN ANGLE = -60 DEGREE, TILT ANGLE = -10 DEGREE, ZOOM VALUE = 5 | form0004.frm |

| PRESET ID | PRESET NAME | PRESET POSITION | ORDER | STOP TIME | TRANSITION TIME |
|---|---|---|---|---|---|
| 0001 | ENTRANCE | PAN ANGLE = 0 DEGREE, TILT ANGLE = 0 DEGREE, ZOOM VALUE = 10 | 1 | 3 | 2 |
| 0002 | WINDOW | PAN ANGLE = 60 DEGREE, TILT ANGLE = 0 DEGREE, ZOOM VALUE = 5 | 3 | 3 | 2.5 |
| 0003 | LAMP | PAN ANGLE = 0 DEGREE, TILT ANGLE = 70 DEGREE, ZOOM VALUE = 13 | 4 | 1 | end |
| 0004 | SHELF | PAN ANGLE = -60 DEGREE, TILT ANGLE = -10 DEGREE, ZOOM VALUE = 5 | 2 | 2 | 4 |

FIG.20

| PRESET ID | PRESET NAME | PRESET POSITION | REGISTRATION SCREEN NAME | USER TYPE |
|---|---|---|---|---|
| 0001 | ENTRANCE | PAN ANGLE = 0 DEGREE, TILT ANGLE = 0 DEGREE | form0001.frm | ADMINISTRATOR |
| 0002 | WINDOW | PAN ANGLE = 60 DEGREE, TILT ANGLE = 0 DEGREE | form0002.frm | ADMINISTRATOR |
| 0003 | LAMP | PAN ANGLE = 0 DEGREE, TILT ANGLE = 70 DEGREE | form0003.frm | ORDINARY USER |
| 0004 | SHELF | PAN ANGLE = -60 DEGREE, TILT ANGLE = -10 DEGREE | form0004.frm | ORDINARY USER |

FIG.21A

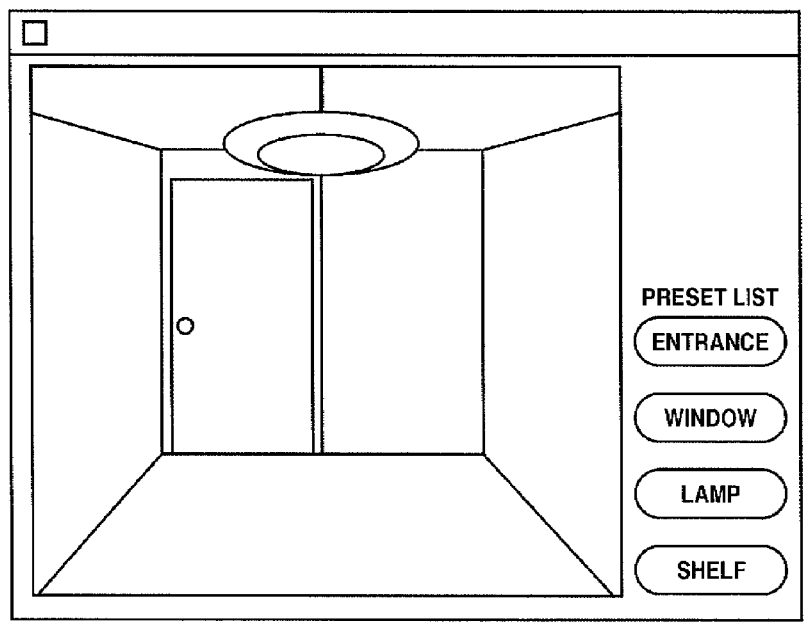

PRESET LIST FOR ADMINISTRATOR

PRESET LIST FOR ORDINARY USER

PRESET LIST
LAMP
SHELF

| TIME | REGISTRATION SCREEN NAME | MESSAGE | OPERATION RESULT |
|---|---|---|---|
| 2006/12/26 11:43:20 | DOOR | IS A DOOR CLOSED? | YES |
| ⋮ | ⋮ | ⋮ | ⋮ |

CAMERA MONITORING APPARATUS AND REGISTRATION METHOD THEREOF

BACKGROUND OF THE INVENTION

1. Field of the Invention

The present invention relates to a monitoring apparatus using a camera placed in a remote place, and a registration method of registering an object status within an image captured by a camera.

2. Description of the Related Art

Conventionally, it is known that a camera can be controlled through a network from a computer. Such a camera is called a network camera. A system including such a network camera and a client terminal that controls operations of the network from a remote place is also known. In the system, the operation of a network camera is controlled by a client terminal, and the client terminal receives still images and/or moving images taken with the network camera via the Internet, or other network. The received images are displayed on a monitor of the client terminal. The images are sent in real time, therefore, a user of the client terminal can easily view a scene in a remote place where the network camera is placed, or monitor the conditions of his home from a distant location.

A conventional system, however, requires control of activation operations every time a connection is established with a network camera. Therefore, the same operations must be performed every time the connection is established, even though the image is to be viewed at frequent intervals. For this reason, it is troublesome to control a network camera.

To improve operability of the network camera, a system that stores parameters such as an image sensing direction in the network camera in advance, that is, having a preset registration system, is discussed in Japanese Patent Application Laid-Open No. 11-191858. In this document, a network camera is controlled in accordance with preset information associated with parameters such as pan, tilt angle and zoom values. Thus, a desired image can be easily obtained.

Further, Japanese Patent Application Laid-Open No. 10-336503 discusses a technique of superimposing and displaying additional information such as the name of an object within an image captured in accordance with the stored parameters, according to zoom magnification. By this method, additional information is displayed in an appropriate manner. Therefore, desired information can be easily obtained.

Further, there is a request for storing a history of a user's confirming that a displayed image has been checked. For example, in a case where a room is being monitored and a door is displayed, a user may desire to store a history that whether the door is open or closed was checked.

SUMMARY OF THE INVENTION

The present invention is directed to a monitoring apparatus and a control method that can respond to user input operations performed on an image displayed from a network camera.

According to an aspect of the present invention, a monitoring apparatus includes a display control unit configured to cause a display device to display an image captured by a camera and to display a registration screen corresponding to the image which allows a user to register an object status within the displayed image, and a registration unit configured to register the object status input by the user via the registration screen.

According to another aspect of the present invention, a method of registering an object status within an image captured by a camera includes causing a display device to display an image captured by a camera and a registration screen corresponding to the image which allows a user to register an object status within the displayed image, and registering the object status input by the user via the registration screen.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a block diagram illustrating the configuration of a camera control system according to a first embodiment of the invention.

FIG. 2A is a flow chart illustrating a process for registering preset information and an input form.

FIG. 2B is a flow chart illustrating a process for displaying registered preset information and performing operations on an input form.

FIG. 3 is a flow chart illustrating the details of a preset information generating process.

FIG. 4 is a flow chart illustrating the details of a preset information registering process.

FIG. 5 is a flow chart illustrating the details of a preset information acquiring process.

FIG. 6 is a flow chart illustrating the details of a preset information display process.

FIG. 7 is a flow chart illustrating the details of a preset operation process.

FIG. 9A illustrates an example of an input form template and an example of an input form.

FIG. 9B illustrates an example of a scalable vector graphics (SVG) source when an input form template is written in SVG.

FIG. 9C illustrates an example of an SVG source when the input form shown in the right side of FIG. 9A is written in an SVG form.

FIG. 10 illustrates an example of a preset information table.

FIG. 11A illustrates a first example of an input form.

FIG. 11B illustrates a second example of the input form.

FIG. 11C illustrates a third example of the input form.

FIG. 11D illustrates a fourth example of the input form.

FIG. 20 illustrates an example of a preset information table obtained in a fourth embodiment of the invention.

FIG. 21A illustrates a display example of a preset list when an administrator user performs an operation.

DETAILED DESCRIPTION OF THE EMBODIMENTS

Figure 8A:
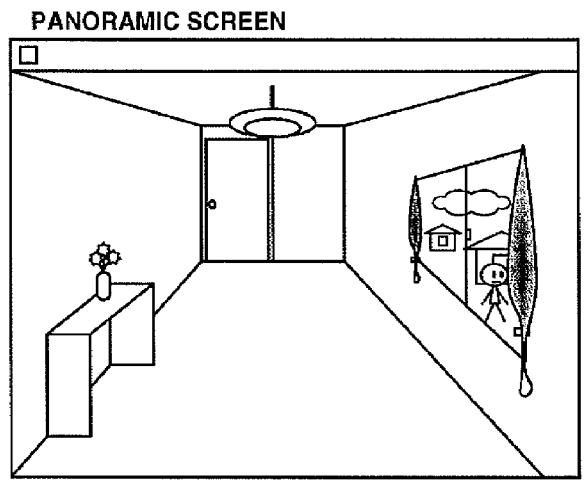
FIG. 8A illustrates a display example of a panoramic image.

Various exemplary embodiments, features, and aspects of the invention will now be described in detail with reference to the drawings.

First Exemplary Embodiment

FIG. 1 is a block diagram illustrating a configuration of a camera control system according to a first exemplary embodiment of the present invention.

In the present embodiment, a monitoring apparatus 100 and a camera control device 200 are coupled to each other through a network 500.

A monitor 600 and an input device 700 are connected to the monitoring apparatus 100. A memory 110, a central processing unit (CPU) 130 and other components are provided inside the monitoring apparatus 100. The memory 110 is a computer-readable memory (storage medium) storing a program which causes the CPU 130 to control the monitoring apparatus 100. This program causes a computer to perform the following functions. That is, the program realizes functions of a monitoring screen display unit 111, a panorama screen display unit 112, an input form display unit 113, a preset information registration receiving unit 114, a preset position definition unit 115 and an input form definition unit 116. Further, the program realizes functions of a preset information acquisition receiving unit 117, a preset display processor 118, an input form operation receiving unit 119, an input form operation processor 120, an input form generator 121, a template acquisition unit 122 and communication controller 123. The CPU 130 implements the function of each unit using the program.

A camera 300 and a panhead 400 are integrally connected to the camera control device 200. The camera control device 200 includes a memory 210, a CPU 230 and a storage device 240. The memory 210 is a computer-readable memory (storage medium) which stores a program that the CPU 230 executes. This program realizes following functions. That is, the program realizes functions of a communication controller 211, a preset information registration unit 212, a preset information acquisition unit 213, a template reading unit 214 and a preset information input/output unit 215. Further, the program realizes functions of a preset display processor 216, an input form input/output unit 217, an input form operation processor 218, an image input unit 219 and a panhead controller 220. An input form template 241, a preset information table 242 and an input form 243 are stored in the storage device 240. The CPU 230 implements the function of each unit based on the program.

Next, the operation of a camera control system as described above will be described. FIGS. 2A and 2B are flow charts illustrating processing in a camera control system according to an exemplary embodiment of the present invention. This processing can be divided broadly into two parts. The first part includes processing for registering preset information and the status of objects within an image which are registered on a registration screen (FIG. 2A). The second part includes processing for displaying the registered preset information and operating the registration screen (FIG. 2B). An input form of the registration screen is processed by the monitoring apparatus 100 and displayed on the monitor 600. In the present embodiment, input form data is defined using structured data such as hypertext markup language (HTML), scalable vector graphics (SVG) or the like.

First, as shown in FIG. 2A, if a predetermined request is input into the monitoring apparatus 100 from the outside through the input device 700 in step S2001, the panorama screen display unit 112 causes the monitor 600 to display a requested panoramic image in step S2002. The predetermined request from the outside is a request for displaying a panoramic image. Here, in the panoramic image, the entire objects within a range which can be photographed by the camera 300, are stitched together into one image. The panoramic image is stored in advance in the memory 110. FIG. 8A illustrates a display example of a panoramic image.

Next, if the predetermined request is input from the outside in step S2003, the monitoring apparatus 100 performs a preset information generating process in step S2004 as shown in FIG. 3. The predetermined request from the outside is a preset information registration request. FIG. 3 is a flow chart illustrating details of the preset information generating process.

Figure 8B:
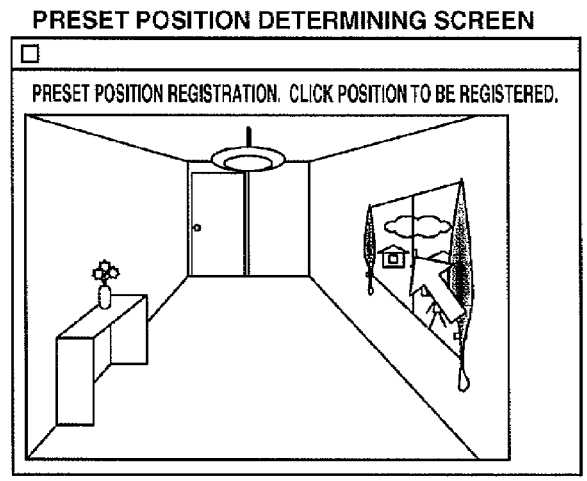
FIG. 8B illustrates a display example of a message.

In the preset information generating process in step S2004 shown in FIG. 3, first, the preset information registration receiving unit 114 receives, through the input device 700, a preset information registration request from the user in step S3001. Then, the preset information registration receiving unit 114 requests the preset position definition unit 115 to start defining a preset position in step S3002. Then, the preset position definition unit 115 causes the monitor 600 to display a message prompting a user to specify a preset position while a panorama screen is displayed in step S3003. FIG. 8B illustrates a display example of such a message. The preset position represents registered pan and tilt angles for defining an image sensing direction of the camera 300.

Next, if a preset position is specified through the input device 700 in step S3004, the preset position definition unit 115 returns the specified position to the preset information registration receiving unit 114 in step S3005. The preset position is specified e.g. by clicking a mouse (i.e., a type of the input device 700).

Next, the preset information registration receiving unit 114 requests the input form definition unit 116 to start defining an input form of a registration screen in step S3006. Then, the input form definition unit 116 requests the template acquisition unit 122 to acquire template data of the input form in step S3007. Then, the template acquisition unit 122 requests the camera control device 200 to send the template data of the input form via the communication controller 123 in step S3008.

Then, the template reading unit 214 of the camera control device 200 receives the request for sending the template data of the input form of the registration screen in step S3009. Then, the template reading unit 214 reads the input form template 241 stored in the storage device 240, and sends the data to the monitoring apparatus 100 through the communication controller 211 in step S3010.

Figure 8C:
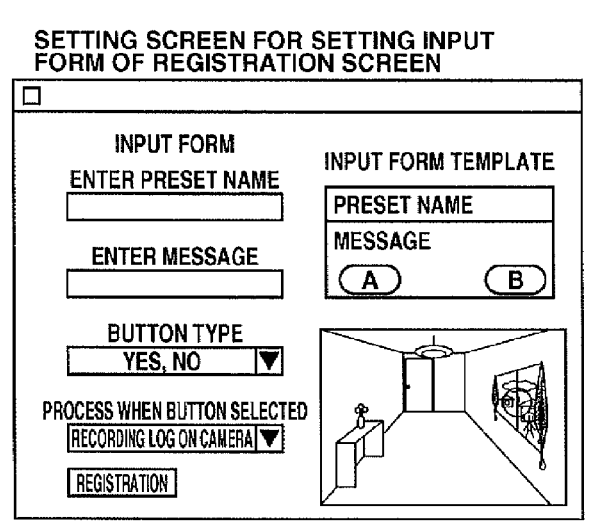
FIG. 8C illustrates a display example of an input form template and messages.

Next, the input form definition unit 116 of the monitoring apparatus 100 performs control and causes the monitor 600 to display an input form template corresponding to the received data and a registration screen. The registration screen prompts a user to register parameters into the input form template in step S3011. FIG. 8C illustrates a display example of a setting screen for setting an input form in the registration screen. The left figure in FIG. 9A is an example of an input form template. FIG. 9B illustrates an example of an SVG source in a case where an input form template shown in the left figure of FIG. 9A is written in SVG. Parameters to be set include "preset name", "message", "button type" and "process of button selection".

When a parameter is input through the input device 700 in step S3012, the input form definition unit 116 transfers the input form template and the parameter to the input form generator 121, and requests the input form generator 121 to generate a registration screen in step S3013. For example, if a "Register" button is clicked while a setting screen is displayed as shown in FIG. 8C, the input form template and parameters are transferred and generation of an input form of the registration screen is requested.

Next, the input form generator 121 generates an input form of the registration screen using the input form template and the parameters, and returns the input form of the registration screen to the input form definition unit 116 in step S3014. Then, the input form definition unit 116 returns the input form of the registration screen to the preset information registration receiving unit 114 in step S3015.

For example, when the input form of the registration screen is generated, a name of the registration screen "Window check" is input into a preset name field and "Is a window locked?" is input into a message field. Further, "Yes, No" is input as a button type, and "Recording log on camera (leave a history in the camera control device 200)" is input as the processing of the button selection. When these inputs are registered, a registration screen shown in the right figure of FIG. 9A is generated. FIG. 9C illustrates an example of an SVG source if the registration screen shown in the right side of FIG. 9A is written in an SVG form.

The preset information generated in this way is held in the memory 110 in step S2004. Subsequently, the monitoring apparatus 100 and the camera control device 200 perform a preset information registering process shown in FIG. 4 in step S2005. FIG. 4 is a flow chart illustrating the details of the preset information registering process.

In the preset information registering process in step S2005, first, the preset information registration receiving unit 114 requests the camera control device 200 to register a preset ID, a preset name and a preset position generated in step S2004 and an input form, in step S4001. That is, the preset information registration receiving unit 114 requests registration of preset information.

Next, the communication controller 211 of the camera control device 200 receives a preset information registration request from the preset information registration receiving unit 114, and requests the preset information registration unit 212 to register the preset information in step S4003. Then, the preset information registration unit 212 requests the preset information input/output unit 215 to register the preset ID, the preset name and the preset position in step S4004. Then, the preset information input/output unit 215 writes the preset ID, the preset name and the preset position into the entry of the preset information table 242 stored in the storage device 240 in step S4005. Here, any identifiable character string can be assigned to the preset ID. Further, for example, a preset name input in the input form is used as the preset name. A value calculated from coordinates of a point clicked on a panoramic image by a user in S3004 is used as the preset position.

Next, calculation of a preset position (a pan angle and a tilt angle) that defines the image sensing direction of the camera 300 is described below. Here, as an example, a panoramic image having a vertical size of H and a lateral size of W is generated in which pan of the camera 300 ranges from −110 to +110 degrees and tilt ranges from −30 to +90 degrees. In such a case, the center of the panoramic image is taken as the origin point, and the x axis is taken in a lateral direction and the y axis is taken in a vertical direction. Under these conditions, if a point having coordinates (x, y) is clicked, obtained p and t are the pan angle and the tilt angle for the clicked point, respectively.

$$\begin{cases} p = \dfrac{220}{W}x \\ t = \dfrac{120}{H}y + 30 \end{cases} \quad (1)$$

However, the coordinates in a panoramic image can be associated with the pan angle and the tilt angle, also in other ways.

After the process is completed in S4005, the preset information registration unit 212 requests the input form input/output unit 217 to register an input form of a registration screen in step S4006. Then, the input form input/output unit 217 stores the input form 243 in the storage device 240, and writes the name of the registration screen into the entry of the preset information table 242 in step S4007. At this time, SVG data of the input form 243 of the registration screen becomes associated with the preset ID. Then, the preset information registration unit 212 notifies the monitoring apparatus 100 of the completion of registration in step S4008 through the communication controller 211.

Next, the communication controller 123 of the monitoring apparatus 100 receives notification of completion of registration in step S4009. Then, the communication controller 123 notifies to the preset information registration receiving unit 114 that registration of the preset information has been completed, in step S4010.

Thus, registration of preset information into the preset information table 242 is performed in step S2005.

In the processes from step S2001 to step S2005, preset information and the input form are registered as described above. When a plurality of preset information types are registered, the foregoing processes from step S2001 to step S2005 are repeated. FIG. 10 illustrates an example of a preset information table if four types of preset registration are performed. FIGS. 11A to 11D show examples of registration screens corresponding to the preset information table shown in FIG. 10.

Figure 12A:
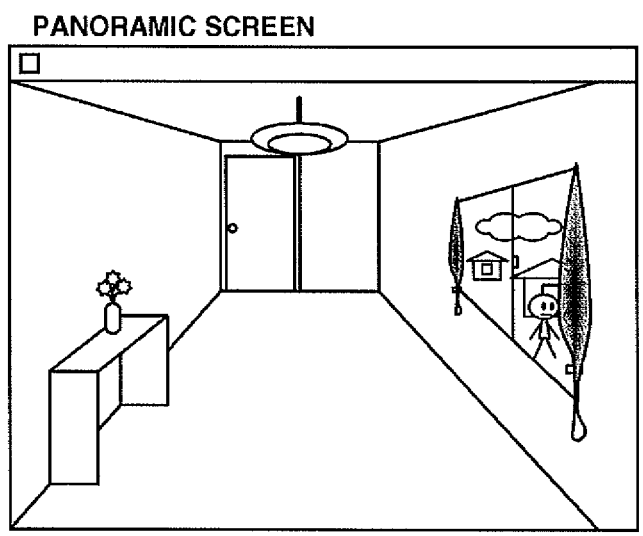
FIG. 12A illustrates a display example of a panorama screen.

After the preset information is registered, the monitoring apparatus 100 acquires a live image that is currently captured by the camera 300. The monitoring apparatus 100 performs control and causes the monitor 600 to display the live image so that an operator monitors the live image. FIG. 2B is a flow chart illustrating processing that is performed on the preset position while a live image currently captured by the camera 300 is monitored. As shown in FIG. 2B, when a predetermined request to the monitoring apparatus 100 is input from the outside through the input device 700 in step S2006, the monitoring apparatus 100 performs a preset information acquiring process in step S2007. Here, the predetermined request from the outside is a request for displaying a live image as well as a request for displaying the preset information input through the input device 700. FIG. 5 is a flow chart illustrating the details of a process in which the monitoring apparatus 100 acquires the preset information stored in the camera control device 200. A panorama screen is displayed until a request for displaying the preset information is received. FIG. 12A illustrates a display example of a panorama screen.

In the preset information acquiring process (step S2007), first, the preset information acquisition receiving unit 117 receives a request for displaying preset information through the input device 700 in step S5001. The preset information acquisition receiving unit 117 then requests the camera control device 200, through the communication controller 123, to send the preset information, in step S5002.

Next, the communication controller 211 of the camera control device 200 receives the request for sending the preset information in step S5003, and requests the preset information acquisition unit 213 to acquire the preset information in step S5004. Then, the preset information acquisition unit 213 requests the preset information input/output unit 215 to read the preset information table 242, in step S5005. After that, the preset information input/output unit 215 reads the preset information table 242 from the storage device 240, and returns the table to the preset information acquisition unit 213 in step S5006. Then, the preset information acquisition unit 213 sends information about the preset information table 242 through the communication controller 211 to the monitoring apparatus 100, in step S5007.

The communication controller 123 of the monitoring apparatus 100 receives information about the preset information table 242, in step S5008, and transfers the received information to the preset information acquisition receiving unit 117 in step S5009.

Thus, the preset information is acquired in step S2007. Then, the monitoring apparatus 100 and the camera control device 200 perform a preset information display process in step S2008 of FIG. 6. FIG. 6 is a flow chart illustrating the details of the preset information display process.

Figure 12B:
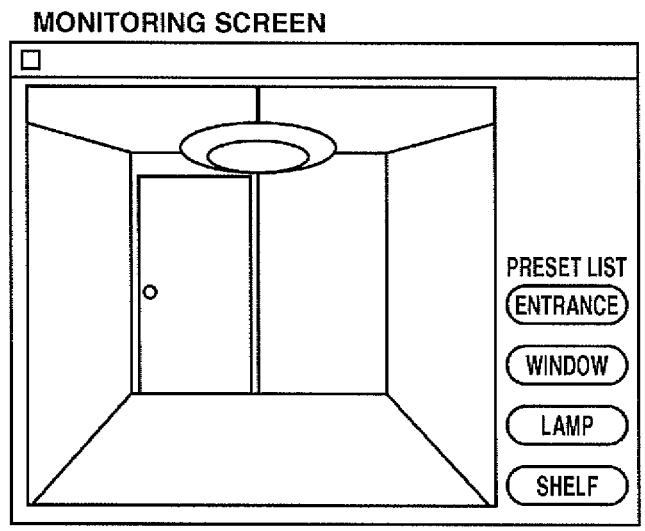
FIG. 12B illustrates a display example of a preset name table.

In the preset information display process (step S2008), first, a preset display processor 118 receives the content of the preset information table 242 from the preset information acquisition receiving unit 117 in step S6001, and displays preset names on the monitor 600 in step S6002. FIG. 12B illustrates a display example of a preset name table. As shown in FIG. 12B, the preset name table is displayed together with a live image currently captured by the camera 300.

In response to a predetermined request received from the user through the input device 700 in step S6003, the preset display processor 118 acquires from the preset information table 242 a preset ID, a preset position and an input form name corresponding to a preset name, in step S6004. The predetermined request is a request for selection of a preset name sent from a user (step S6003). Then, the preset display processor 118 sends a request to display the preset information together with the preset ID, the preset position and the registration screen name through the communication controller 123 to the camera control device 200 in step S6005.

Next, the communication controller 211 of the camera control device 200 receives the display process request together with the preset ID, the preset position and the registration screen name in step S6006, and transfers the preset ID, the preset position and the registration screen name to the preset display processor 216 in step S6007. Then, the preset display processor 216 transfers the preset position to the panhead controller 220 in step S6008. After that, the panhead controller 220 sets the pan angle and the tilt angle of the panhead 400 in accordance with the preset position information. After movement of image sensing directions is completed, the panhead controller 220 notifies the completion of the movement to the preset display processor 216 in step S6009. Then, the preset display processor 216 makes a request to the image input unit 219 for image data captured by the camera 300 in step S6010. Then, the image input unit 219 requires the image input unit 219 to acquire from the camera 300 a live image that is currently captured, and transfers the image data to the preset display processor 216 in step S6011. After that, the preset display processor 216 transfers the registration screen name to the input form input/output unit 217 in step S6012. Then, the input form input/output unit 217 reads the input form 243 corresponding to the registration screen name from the storage device 240, and transfers the input form 243 to the preset display processor 216 in step S6013. Then, the preset display processor 216 sends the image data and the input form corresponding to the registration screen name through the communication controller 211 to the monitoring apparatus 100 in step S6014.

Figure 12C:
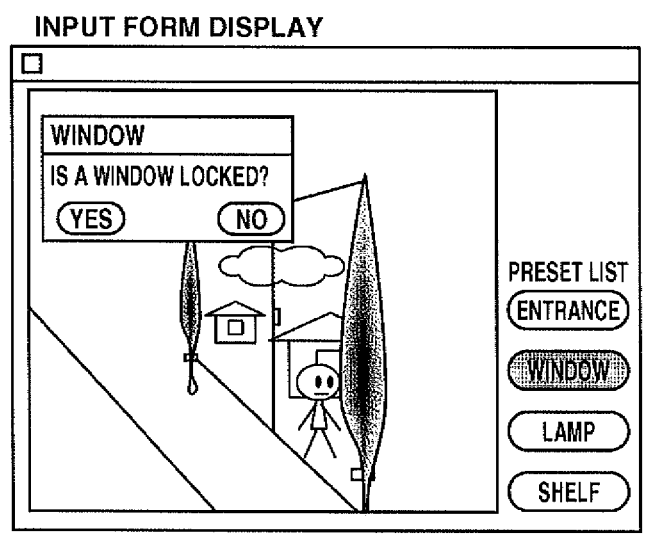
FIG. 12C illustrates a display example of an input form of selected preset information.

Next, the communication controller 123 of the monitoring apparatus 100 receives the image data and the input form corresponding to the registration screen name in step S6015, and transfers the image data and the input form to the preset display processor 118 in step S6016. Then, the preset display processor 118 transfers the image data to the monitoring screen display unit 111 in step S6017. After that, the monitoring screen display unit 111 displays the image data on the monitor 600 in step S6018. Then, the preset display processor 118 transfers the input form of the registration screen to the input form display unit 113 in step S6019. Then, the input form display unit 113 causes the monitor 600 to display the registration screen based on the input form together with the image data in step S6020. FIG. 12C illustrates a display example of the registration screen corresponding to the selected preset information.

Thus, the preset information and the registration screen are displayed in step S2008. Then, under the conditions shown in FIG. 12C, if a user inputs an object status within a live image through the registration screen in step S2009, the monitoring apparatus 100 and the camera control device 200 perform a preset operation process in step S2010 of FIG. 7. That is, if an object status within the image is input through the registration screen, the preset operation process starts in step S2010. FIG. 7 is a flow chart illustrating the details of a process for registering an object status within a live image. For example, if a "Yes" button or a "No" button is selected while the registration screen of FIG. 12C is displayed, a process for registering an object status within a live image is performed.

In the process of registering an object status in a live image in step S2010, when input of the image status into the registration screen is completed (YES in step S7002), first, the input form display unit 113 hides the registration screen, and transfers a processing command to the input form operation processing receiving unit 119 in step S7002. The input form operation processing receiving unit 119 receives the processing command written in the input form of the registration screen in step S7003. For example, in an example shown in FIG. 9C, a processing command in a case where a "Yes" button or a "No" button is selected, is written in a Java® script. The content of processing is switched according to the value of a variable "action_id". In this case, the variable "action_id" is set to 1, and therefore the function "saveLog( )" is called when a button is selected. The function is processed to store information as to a selected button as a history.

Figures 21B, 22:
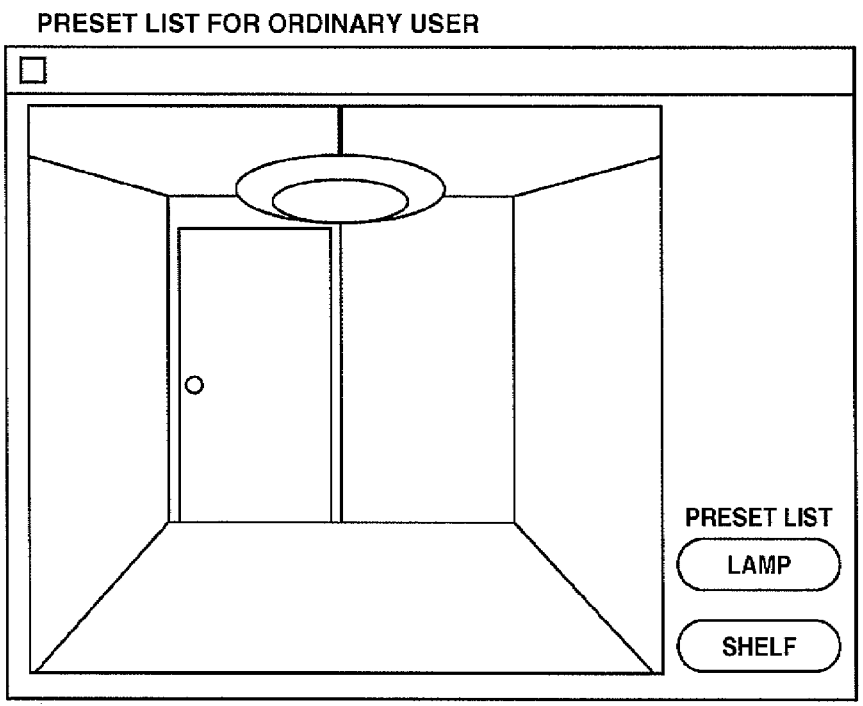
FIG. 21B illustrates a display example of a preset list when an ordinary user performs an operation.
FIG. 22 illustrates an example of registered history information.

The input form operation processing receiving unit 119 determines whether the information about the selected button is processed by the input form operation processor 120 or by the camera control device 200. As a result, if the information is processed inside the monitoring apparatus 100 (YES in step S7004), the input form operation processing receiving unit 119 transfers a processing command to the input form operation processor 120 of the monitoring apparatus 100 in step S7005. Then, according to the specified processing command, the input form operation processor 120 performs the process (the process to register information about the selected button as history information) in step S7006. More specifically, the information whether a "Yes" button or a "No" button is selected and the information about the time of selection are associated with each other as history information, and stored in the memory 110. FIG. 22 illustrates an example of information to be registered as history information. As shown in FIG. 22, information about the registration screen name, the message and the operation result is registered as history information in association with the time information.

The time information can be acquired from a timer provided in the monitoring apparatus, or can also be time information that is associated with the image data displayed when a button is selected. When the process is completed, the input form operation processor 120 notifies the completion of processing to the input form operation processing receiving unit 119 in S7007.

On the other hand, if the information is not processed inside the monitoring apparatus 100 (NO in step S7004), the input form operation processing receiving unit 119 sends the content of processing of the function "saveLog( )", as a processing command, through the communication controller 123 to the camera control device 200 in step S7008.

Whether the processing is performed inside the monitoring apparatus 100 or inside the camera control device 200 is determined in step S7004 by "Process when button selected" of FIG. 8C. That is, if "Recording log on camera" is set, information is registered as history information in the storage device 240 of the camera control device 200. If "Recording log on monitoring apparatus" is set, information is registered as history information in the memory 110 of the monitoring apparatus 100.

Next, the communication controller 211 of the camera control device 200 receives the processing command in step S7009, and transfers the processing content to the input form operation processor 218 in step S7010. Then, according to the specified processing command, the input form operation processor 218 performs the process in step S7011. For example, the input form operation processor 218 causes the storage device 240 to store the status of an input image as history information. As status information of an object within an image, for example, an operation result corresponding to "Yes" or "No" in FIG. 12C is stored together with time information similar to step S7006. After that, when processing ends, the input form operation processor 218 notifies the completion of processing to the monitoring apparatus 100 through the communication controller 211 in step S7012.

The communication controller 123 of the monitoring apparatus 100 receives notification of the completion of processing in step S7013, and notifies the input form operation processing receiving unit 119 of the completion in step S7014.

Thus, the preset operation process is performed in step S2010.

According to the first embodiment as described above, displaying a message such as a prompt to check whether the door is open or closed, can be included in the preset information, and a result of a door open/close check, etc. can also be stored. In other words, according to the first embodiment, it is possible to perform interactive operations with a preset image or to store the operation result.

Second Exemplary Embodiment

Next, a second embodiment of the invention will be described. In the second embodiment, preset information is generated similar to the flow of the preset information generating process in the first embodiment. However, in the first embodiment, the preset position is specified only by coordinates on an image. On the other hand, in the second embodiment the preset position is specified by area.

Figure 13A:
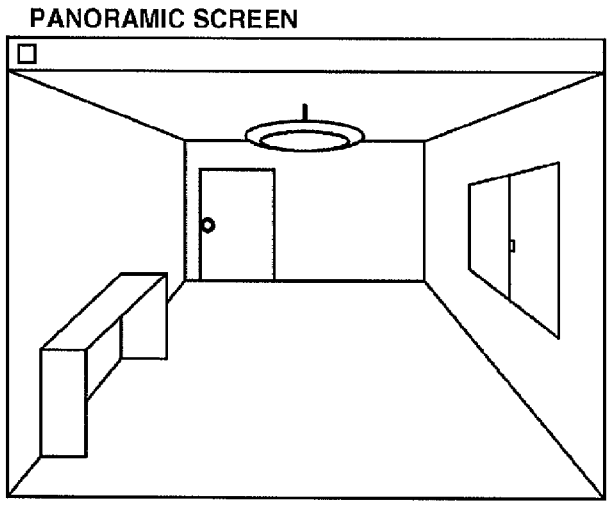
FIG. 13A illustrates a display example of a panorama screen.

More specifically, in the process in step S3004 (FIG. 3), a preset position is determined by drag operations. That is, a request for specifying a part of an image area is performed by drag operations. First, the upper left edge of a panoramic image shown in FIG. 13A is taken as an origin point. An x axis is taken in a right direction of the screen, and a y axis in the down direction of the screen. The ratio of the width to the height of a monitor image is set to be W:H.

Figure 13B:
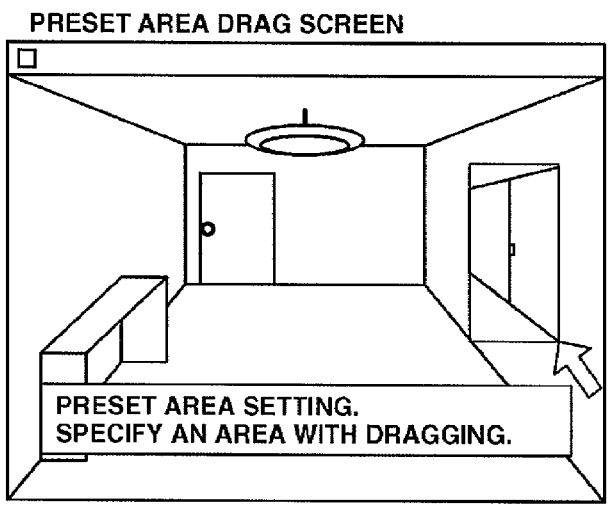
FIG. 13B illustrates a method of specifying a preset area.

As shown in FIG. 13B, a coordinate at the upper left edge of an area which is dragged so as to surround a window, is set to (x0, y0). The width of the dragged area when the dragging is finished, is set to wd, and the height of the dragged area to hd. The width and the height of the preset area are determined according to expression (2). The parameter values are determined by the preset information registration receiving unit 114.

$$\frac{wd}{hd} > \frac{W}{H} \text{ のとき} \begin{cases} \text{width} = wd \\ \text{height} = \frac{H}{W}wd \end{cases} \quad (2)$$

$$\frac{wd}{hd} \leq \frac{W}{H} \text{ のとき} \begin{cases} \text{width} = \frac{W}{H}hd \\ \text{height} = hd \end{cases}$$

Figure 13C:
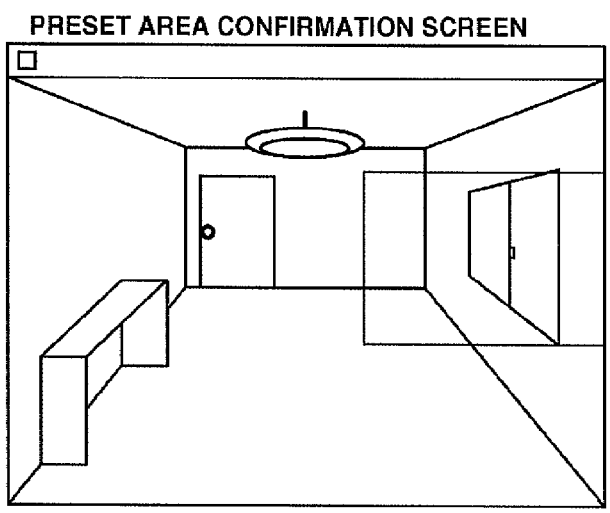
FIG. 13C illustrates a state where a preset area is specified.

By such processing, the aspect ratio of a preset area is adjusted to the aspect ratio of a monitor image as shown in FIG. 13C. The zoom value z is determined from the relationship: z=W/width. However, z is set such that the ratio of the longitudinal and lateral widths of a panoramic image to the longitudinal and lateral lengths of a preset area is 1: (1/z). Finally, the central coordinates (xc, yc) of a preset area can be determined as follows.

When $x0$+width$\geq W$, $xc=W$−width/2

When $x0$+width$<W$, $xc=x0$+width/2

When $y0$+height$\geq H$, $yc=H$−height/2

When $y0$+height$<H$, $yc=y0$+height/2

Figures 14, 15:
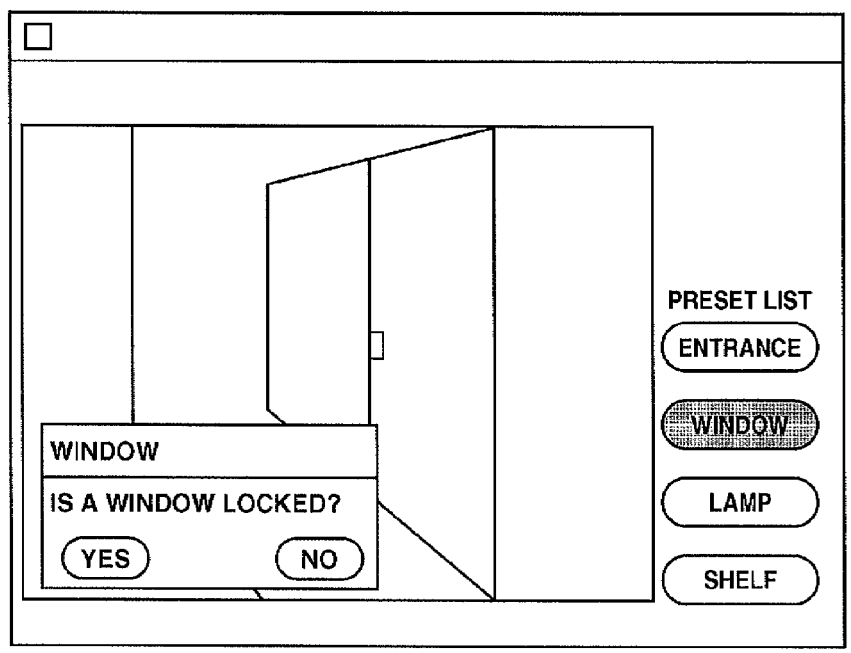
FIG. 14 illustrates a preset information table obtained in a second embodiment of the invention.
FIG. 15 illustrates a state where modification of zooming has been performed.

An example of a preset information table determined in this way is shown in FIG. 14.

In the second embodiment, in contrast to the first embodiment, also zooming is adjusted when the panhead 400 is controlled in step S6009 (FIG. 6) in the preset information display process. As a result of adjustment of zooming, the screen of an input form is displayed, for example, as shown in FIG. 15. The preset area calculated from an area specified by dragging in preset registration is displayed over the entire monitor screen.

Third Exemplary Embodiment

Figures 16, 17:
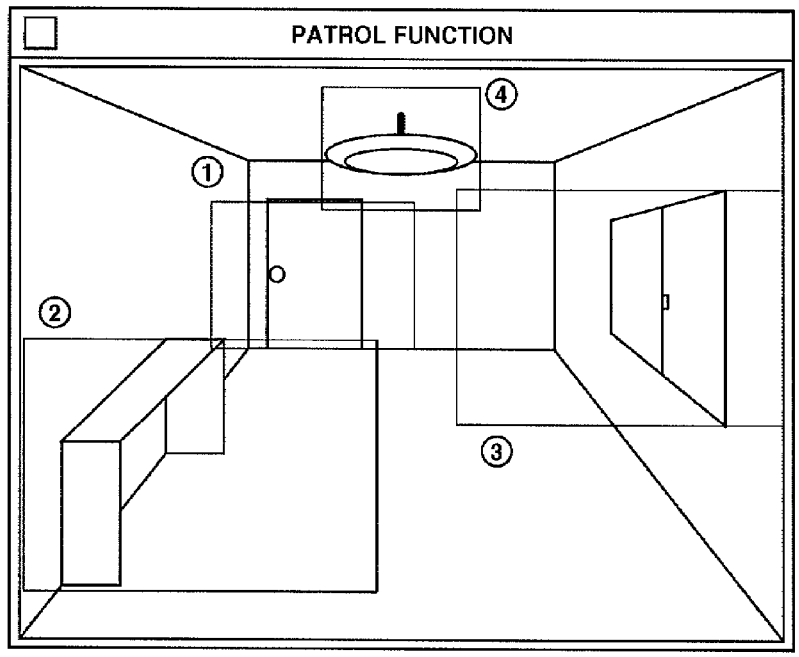
FIG. 16 illustrates an example of a screen for registering preset information.
FIG. 17 illustrates an example of a preset information table for performing a patrol function.

Next, a third embodiment of the invention will be described. In the third embodiment, while the same processes as in the second embodiment are performed, further a preset order, a stop time and a transition time up to the next preset are set in each preset registration to allow a preset patrol. Here, the preset order means the order in which presets are displayed on a screen, and presets are displayed in this order. The stop time is a period of time during which parameters of a camera are maintained without changes in pan, tilt angle and zoom value while the registered preset is displayed. The transition time up to the next preset is a period of time required for changing parameters of a camera between presets. FIG. 16 illustrates an example of a screen in which preset information is registered, and FIG. 17 illustrates an example of a preset information table for performing a patrol function. Together with combinations of names of input forms (preset names) and control parameter values (preset positions), the display order on the monitor 600 for each combination is registered in the preset information table.

Next, in preset transition (preset patrol), if changes from values of the preset before transition to values of the preset after transition are linear, preset positions (P: pan angle, T: tilt angle, and z: zoom value) at each time t (second) in transition are represented by the following equations:

$$P = Pi + (Pj - Pi) \times (t - ts)/td$$

$$T = Ti + (Tj - Ti) \times (t - ts)/td$$

$$Z = Zi + (Zj - Zi) \times (t - ts)/td$$

where, t=0 when a patrol starts; a pan angle in the ith preset in the preset order is set to Pi, a tilt angle to Ti, and a zoom value to Zi; and a pan angle in the jth ((i+1)=j) preset in the preset order is set to Pj, a tilt angle to Tj, and a zoom value to Zj. Transition from the ith preset to the jth preset starts at time ts, and the transition time is set to td.

Figure 18:
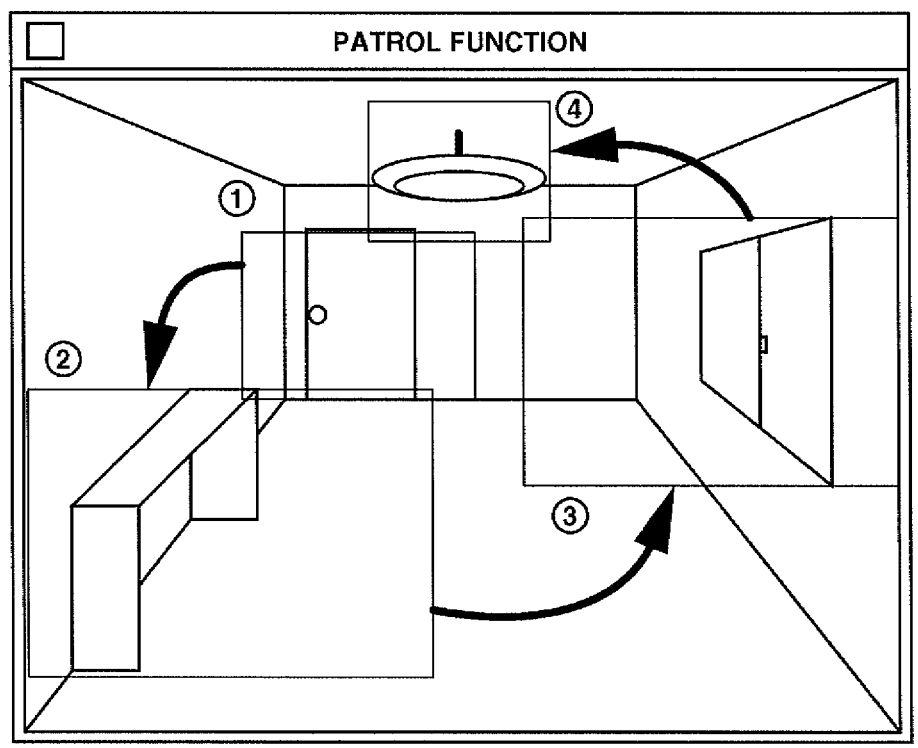
FIG. 18 illustrates preset change in performing a preset patrol.
Figure 19:
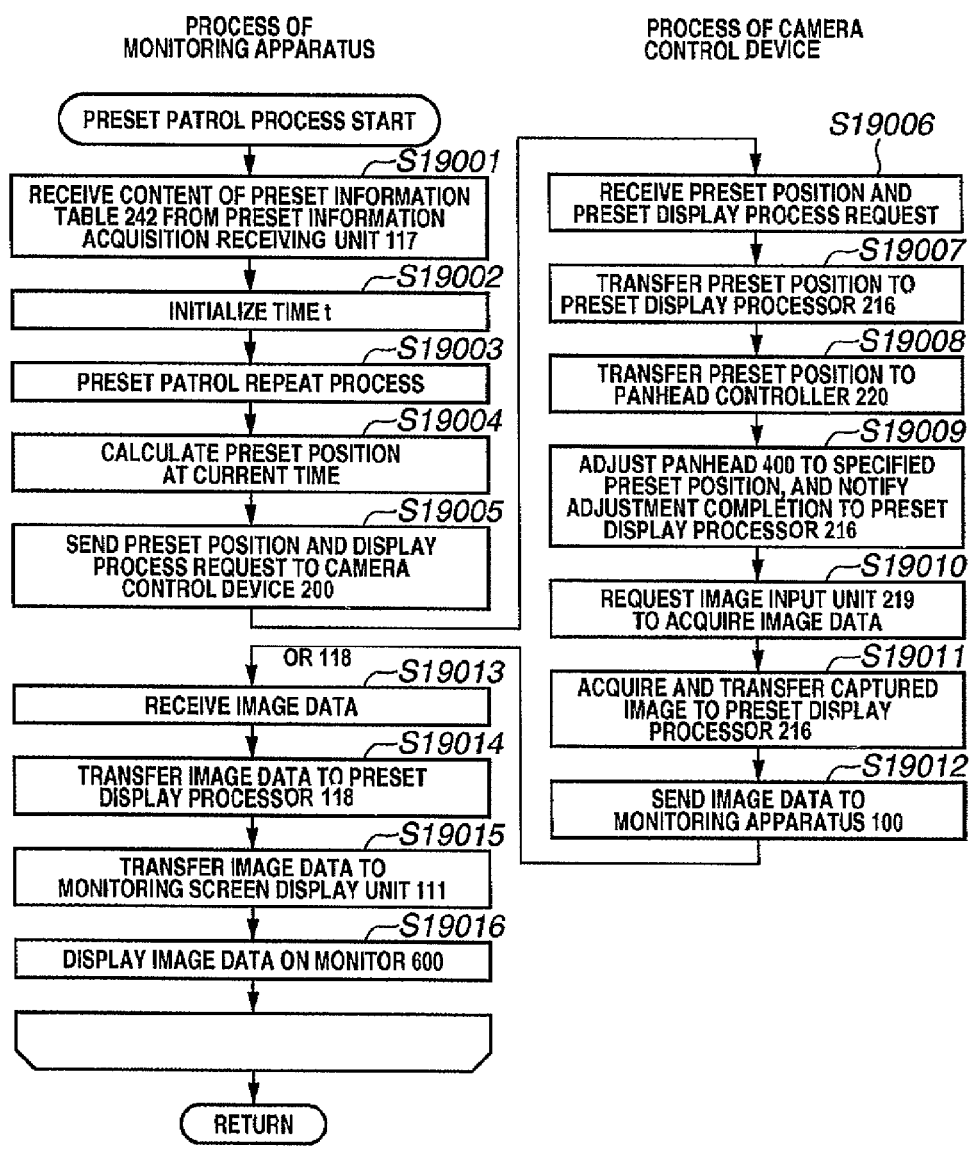
FIG. 19 is a flow-chart illustrating the details of processing for a preset patrol.

FIG. 18 illustrates preset transition in performing a preset patrol. FIG. 19 is a flow chart illustrating the details of processing of a preset patrol.

When the processing of a preset patrol starts, the preset display processor 118 of the monitoring apparatus 100 receives the content of the preset information table 242 from the preset information acquisition receiving unit 117 in step S19001 of FIG. 19. Then, the preset display processor 118 initializes the patrol starting time to t=0 in step S19002.

Then, a repeating process of a preset patrol starts in step S19003. In the process, first, the preset display processor 118 calculates the preset position at the current time by the above-mentioned equations in step S19004. Then, the preset display processor 118 sends the calculated preset position and a display request of preset information through the controller 123 to the camera control device 200 in step S19005.

Next, the communication controller 211 of the camera control device 200 receives the preset position and the display request in step S19006, and transfers the preset position and the display request to the preset display processor 216 in step S19007. Then, the preset display processor 216 transfers the preset position to the panhead controller 220 in step S19008. After that, the panhead controller 220 adjusts the preset position of the panhead 400 in accordance with the preset position information, and after the adjustment is completed, notifies the preset display processor 216 of the completion in step S19009. Then, the preset display processor 216 makes a request to the image input unit 219 for image data captured by the camera 300 in step S19010. Then, the image input unit 219 acquires the captured image data from the camera 300, and transfers the image data to the preset display processor 216 in step S19011. Then, the preset display processor 216 sends the image data through the communication controller 211 to the monitoring apparatus 100 in step S19012.

Next, the communication controller 123 of the monitoring apparatus 100 receives the image data in step S19013, and transfers the image data to the preset display processor 118 (S19014). Then, the preset display processor 118 transfers the image data to the monitoring screen display unit 111 in step S19015. After that, the monitoring screen display unit 111 displays the image data on the monitor 600 in step S19016. Then, processing from step S19004 to step S19016 are repeated until the patrol ends.

Fourth Exemplary Embodiment

Next, a fourth embodiment of the invention will be described. Also in the fourth embodiment, preset information is generated similar to the preset information generating process in the first embodiment. However, in addition to preset positions and input forms, user types are registered in the fourth embodiment.

More specifically, in the present embodiment, two kinds of users, that is, administrator users and ordinary users, can be registered. The administrator users can see information about both "Administrator" and "Ordinary user", while the ordinary users can see only information about "Ordinary user" and cannot see information about "Administrator". Under such conditions, in a case where "Administrator" is registered when a user has preset names of "Entrance" and "Window", and "Ordinary user" is registered when a user has preset names of "Lamp" and "Shelf", the content of the preset information table 242 is as shown in FIG. 20.

When a preset is selected, the preset information acquisition receiving unit 117 receives user information together with a request for displaying preset information in step S5001 of the preset information acquiring process as shown in FIG. 5. In step S5002, the preset information acquisition receiving unit 117 requests the camera control device 200 to send the preset information, and sends the user information. In the camera control device 200, the preset information input/output unit 215 compares the content of the preset information table 242 with the user information received from the monitoring apparatus 100, and returns only the preset information that matches the user information, to the preset information acquisition unit 213 in step S5006. That is, the preset information input/output unit 215 selects the preset information to be returned to the preset information acquisition unit 213.

More specifically, if user information is "Administrator", all the information of the preset information table 242 is sent. On the other hand, if user information is "Ordinary user", only preset information registered for "Ordinary user" is extracted from the preset information table 242, and is sent to the monitoring apparatus 100. FIG. 21A illustrates a display example of a preset list when an administrator user performs operations, and FIG. 21B illustrates a display example of a preset list when an ordinary user performs operations.

While the display of a preset list is switched depending on the registered user information according to the present embodiment, the display of a preset list can also be switched depending on the time period.

An embodiment of the invention can be realized, for example, by a computer executing a program. Media for supplying a program to a computer, e.g. computer-readable record media such as CD-ROMs for recording such a program and transmission media such as the Internet for sending such a program, can also constitute an exemplary embodiment of the present invention. The foregoing program also constitutes an exemplary embodiment of the invention. The foregoing program, record media, transmission media and program products are included within the scope of the invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-355889 filed Dec. 28, 2006, which is hereby incorporated by reference herein in its entirety.

What is claimed is:

1. A monitoring apparatus comprising:
a display control unit configured to cause a display device to display an image captured by a camera which is remotely controlled over a network and a registration screen corresponding to a physical direction the camera is facing for capturing the image; and
a registration unit configured to register a status of an object seen in the image captured by the camera, input to the registration screen by a user.

2. The monitoring apparatus according to claim 1, wherein the display control unit is configured to cause the display device to display the registration screen corresponding to a preset direction defined by at least pan and tilt angles of the camera when the physical direction of the camera is facing in the preset direction.

3. The monitoring apparatus according to claim 1, wherein the display control unit switches the registration screen displayed on the display device according to a time period.

4. The monitoring apparatus according to claim 1, wherein the display control unit switches the registration screen displayed on the display device according to a user type.

5. A method of registering data within an image captured by a camera, the method comprising:
causing a display device to display an image captured by a camera which is remotely controlled over a network and a registration screen corresponding to a physical direction the camera is facing for capturing the image; and
registering a status of an object seen in the image captured by the camera, input to the registration screen by a user.

6. The method according to claim 5, further comprising causing the display device to display the registration screen corresponding to a preset direction defined by at least pan and tilt angles of the camera when the physical direction of the camera is facing in the preset direction.

7. The method according to claim 5, further comprising switching the registration screen displayed on the display device according to a user type.

8. The method according to claim 5, further comprising switching the registration screen displayed on the display device according to a time period.

9. A non-transitory computer-readable storage medium storing a program which causes a computer to execute a method of registering data within an image captured by a camera, the method comprising:
causing a display device to display an image captured by a camera which is remotely controlled over a network and a registration screen corresponding to a physical direction the camera is facing for capturing the image; and
registering a status of an object seen in the image captured by the camera, input to the registration screen by a user.

10. The storage medium according to claim 9, wherein the method further comprises causing the display device to display the registration screen corresponding to a preset direction defined by at least pan angle and tilt angle of the camera when the physical direction of the camera facing in the preset direction.

11. The storage medium according to claim 9, wherein the method further comprises switching the registration screen displayed by the display device according to a user.

12. The storage medium according to claim 9, wherein the method further comprises switching the registration screen displayed by the display device according to a time period.

* * * * *